United States Patent
Li et al.

(10) Patent No.: US 9,502,928 B2
(45) Date of Patent: Nov. 22, 2016

(54) MOTOR DESIGN FOR REDUCING COGGING TORQUE AND TORQUE RIPPLE WHILE MAINTAINING EFFICIENCY

(75) Inventors: Hu Li, Osaka (JP); Yuichi Yoshikawa, Osaka (JP); Hiroshi Murakami, Osaka (JP); Haruhiko Kado, Osaka (JP); Kiyomi Kawamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 296 days.

(21) Appl. No.: 13/636,303

(22) PCT Filed: Mar. 24, 2011

(86) PCT No.: PCT/JP2011/001720
§ 371 (c)(1),
(2), (4) Date: Dec. 10, 2012

(87) PCT Pub. No.: WO2011/118214
PCT Pub. Date: Sep. 29, 2011

(65) Prior Publication Data
US 2013/0076195 A1     Mar. 28, 2013

(51) Int. Cl.
*H02K 29/03* (2006.01)
*H02K 1/16* (2006.01)
(Continued)

(52) U.S. Cl.
CPC .............. *H02K 1/16* (2013.01); *H02K 1/146* (2013.01); *H02K 1/165* (2013.01); *H02K 21/16* (2013.01); *H02K 29/03* (2013.01); *H02K 2213/03* (2013.01)

(58) Field of Classification Search
CPC .......... H02K 21/00; H02K 1/16; H02K 1/08; H02K 1/14; H02K 1/146; H02K 1/165; H02K 29/03; H02K 21/16; H02K 2213/03

USPC .................... 310/216.001–216.137
See application file for complete search history.

(56) References Cited

U.S. PATENT DOCUMENTS 3,860,843 A * 1/1975 Kawasaki et al. ..... H02K 21/22
                                                       310/156.26
4,169,998 A * 10/1979 Harada et al. ................. 335/284
(Continued)

FOREIGN PATENT DOCUMENTS

JP      06-217478 A      8/1994
JP      08-322167 A     12/1996
(Continued)

OTHER PUBLICATIONS

Tajima, Fumio; Miyashita, Kunio; Tamura, Akira; Konno, Takeo; Permanent Magnetic Field Type Brushless Motor (English Translation), Sep. 11, 1998; Hitachi LTD, JPH 10243621 (A).*
(Continued)

*Primary Examiner* — Terrance Kenerly
*Assistant Examiner* — Alexander Singh
(74) *Attorney, Agent, or Firm* — Brinks Gilson & Lione (57) ABSTRACT

A motor of this invention comprises a rotor having a permanent magnet, the number of which magnet poles is P, and a stator including M pcs of teeth, the teeth arranged in a circumferential direction in a manner to face the permanent magnet through a spatial gap, wherein the stator includes stator core having the number M of the teeth, and a winding wire wound about each of the tooth, wherein the number P of the magnet poles and the number M of the teeth have a relation defined by formulae (2/3)M<P<(4/3)M, and M≠P, and wherein ratio (t1/Ds) of teeth tip width t1 to stator inside diameter Ds is given by a formula 0.18<(t1/Ds)<0.25.

15 Claims, 5 Drawing Sheets

(51) Int. Cl.
*H02K 21/16* (2006.01)
*H02K 1/14* (2006.01)

(56) References Cited

U.S. PATENT DOCUMENTS

| | | | |
|---|---|---|---|
| 5,723,928 A * | 3/1998 | Imai et al. | 310/114 |
| 6,028,385 A * | 2/2000 | Pengov et al. | 310/166 |
| 6,218,760 B1 * | 4/2001 | Sakuragi et al. | 310/216.111 |
| 6,313,558 B1 | 11/2001 | Abukawa et al. | |
| 6,849,960 B2 * | 2/2005 | Hartman et al. | 290/1 C |
| 7,382,076 B2 * | 6/2008 | Miyamori et al. | 310/216.091 |
| 2002/0009962 A1 * | 1/2002 | Swaddle et al. | 451/355 |
| 2002/0067092 A1 * | 6/2002 | Crapo et al. | 310/156.47 |
| 2005/0017591 A1 * | 1/2005 | Brewster et al. | 310/179 |
| 2005/0086678 A1 | 4/2005 | Miyamori et al. | |
| 2005/0269895 A1 | 12/2005 | Innami et al. | |
| 2006/0028087 A1 * | 2/2006 | Ionel et al. | 310/218 |
| 2006/0082241 A1 * | 4/2006 | Enomoto et al. | 310/216 |
| 2006/0138894 A1 * | 6/2006 | Harada et al. | 310/217 |
| 2007/0046130 A1 * | 3/2007 | Enomoto et al. | 310/216 |
| 2007/0090716 A1 * | 4/2007 | Oki et al. | 310/216 |
| 2007/0126305 A1 * | 6/2007 | Okuma et al. | 310/156.53 |
| 2007/0273241 A1 * | 11/2007 | Niguchi et al. | 310/259 |
| 2008/0001486 A1 * | 1/2008 | Smith | 310/52 |
| 2008/0012445 A1 * | 1/2008 | Abe et al. | 310/217 |
| 2008/0218023 A1 * | 9/2008 | Niguchi et al. | H02K 1/278 310/156.55 |
| 2010/0295403 A1 * | 11/2010 | Morita et al. | 310/156.78 |

FOREIGN PATENT DOCUMENTS

| | | | |
|---|---|---|---|
| JP | 10-243621 A | | 9/1998 |
| JP | 10243621 A | * | 9/1998 |
| JP | 2000-209829 A | | 7/2000 |
| JP | 2001-157428 A | | 6/2001 |
| JP | 2003-011320 A | | 1/2003 |
| JP | 2003-111320 A | | 4/2003 |
| JP | 2003-111360 A | | 4/2003 |
| JP | 2004-088905 A | | 3/2004 |
| JP | 2004-274963 A | | 9/2004 |
| JP | 2005-151757 A | | 6/2005 |
| JP | 2005-151798 A | | 6/2005 |
| JP | 2005-348522 A | | 12/2005 |
| JP | 2006-187174 A | | 7/2006 |
| JP | 2007-011455 A | | 1/2007 |
| JP | 2007-259513 A | | 10/2007 |
| JP | 2008-245488 A | | 10/2008 |
| JP | 2009-044913 A | | 2/2009 |

OTHER PUBLICATIONS

International Search Report for International Application No. PCT/JP2011/001720, dated Apr. 26, 2011, 2 pages.
English Language Translation of Search Report in Chinese Application No. 201180015845.2, dated Apr. 3, 2014, 3 pages.
Dohmeki, H. et al., "An Improvement in Cogging Torque of PMSM by Slot/Pole Ratio", *The Papers of Technical Meeting on Rotating Machinery*, IEE Japan, Jun. 17, 2004, 15 pages. (with English language translation).
Dohmeki, H., "High Efficiency Motor Technology for Energy-Saving and Higher Functionality", *Nikkan Kogyo Shimbun Ltd.*, Apr. 28, 2001, 13 pages. (with English language translation).
Hitachi Metals, Ltd., "Anisotropic Ring Magnets, Magnet Product Guide", Apr. 2007, 5 pages. (with English language translation).
Matsuoka, A. et al., "Examination of Performance Improvement Brushless DC Fan Motors", *The Papers of Technical Meeting on Rotating Machinery*, IEE Japan, Nov. 11, 1999, 7 pages (with English language Abstract).
Matsuoka, A. et al., "Performance Improvement of Brushless DD Fan Motors with Iron Mixed Plastic Core", *The Papers of Technical Meeting on Rotating Machinery*, IEE Japan, Nov. 30 and Dec. 1, 2006, 6 pages (with English language Abstract).
Nagatake, K., "Motor and Inverter Technology for Household Electrical Appliances", *Nikkan Kogyo Shimbun Ltd.*, Apr. 28, 2000, 12 pages (with English language translation).
First Office Action and English language translation thereof, for Chinese Patent Application No. 201180015845.2, dated Apr. 3, 2014, 7 pages.
Second Office Action and English language translation thereof, for Chinese Patent Application No. 201180015845.2, dated Dec. 12, 2014, 5 pages.
Third Office Action and English language translation thereof, for Chinese Patent Application No. 201180015845.2, dated Jun. 17, 2015, 18 pages.

\* cited by examiner

MOTOR DESIGN FOR REDUCING COGGING TORQUE AND TORQUE RIPPLE WHILE MAINTAINING EFFICIENCY

This application is 371 application of PCT/JP2011/001720 having an international filing date of Mar. 24, 2011, which claims priority to JP2010-069616 filed Mar. 25, 2010, the entire contents of which are incorporated herein by reference.

TECHNICAL FILED

This invention relates to a brushless motor which employs a permanent magnet.

BACKGROUND ART

A permanent magnet brushless motor in which a concentrated winding wire is made on every tooth thereof is widely used in an electrical home apparatus, audio equipment, an information apparatus, transportation equipment and the like. With this type of motor, torque ripple or cogging torque occurs with magnetic attraction exerting over permanent magnet and teeth, causing a vibration and a noise problem.

To obtain a low vibration and a low noise motor, methods of reducing the cogging torque have been practiced, such as optimization of number of poles and teeth, skewing, and magnetization of the magnet in sinusoidal waveform. For examples, patent document 1 discloses a method of reducing cogging torque by determining a relation between number of pole P and number of teeth M to P:M=10:12. Patent document 2 discloses a method for reducing torque ripple by determining a relation between number of pole P and number of teeth Q to P/Q>0.8, and a relation between teeth tip width bt1 and pole pitch τp to bt1/τp≤0.8. Patent document 3 discloses a method of reducing the cogging torque, with a motor having a P to Q ratio of 3:4, by determining a teeth width at an electrical angle of 145 to 165 degrees and 85 to 105 degrees, without sacrificing an output torque. Patent document 4 discloses a structure in which a shape of a magnet arranged on a surface of rotor is made thicker toward a center of the magnetic pole but gradually made thinner toward a space between magnetic poles. By taking the structure, patent document 4 aims a pattern of magnetic flux density on the surface of the rotor to come closer to a sinusoidal waveform, thereby reducing cogging torque and achieving a low vibration and a low noise. Patent document 5 describes an idea of magnetizing the magnet in essentially a sinusoidal waveform instead of adjusting configuration of the magnet, aiming a surface magnetic flux waveform forms a lean sinusoidal waveform and a surface magnetic flux in a neighborhood of pole boundaries becomes essentially zero. By magnetizing the magnet in this pattern, patent document 5 aims to decrease cogging torque and therewith realize a low vibration and a low noise.

However, with above mentioned conventional technologies, although cogging torque or torque ripple causing noise and vibration is somewhat reduced, motor efficiency is not yet specifically addressed. The conventional technologies are therefore not complete enough as a motor for home apparatus such as a fan motor of air conditioner where demand not just for a low vibration and a low noise but for a high efficiency is increasing year by year, leaving a task. Further, adjusting the shape of the magnet as in patent document 4 is difficult in production. Furthermore, for securing a large magnetic flux density, a thick magnet is required, increasing a usage amount of the magnet therefore an increase in cost, leaving a task. Still further, with the magnetizing method described in patent document 5, a neighborhood of pole boundaries is not fully magnetized, so magnetic power of the magnet is not effectively utilized, lowering the efficiency of the motor, leaving another task.

With a conventional fan motor for air conditioner, a link type divided core is traditionally used in which divided cores are linked together to enhance a motor efficiency and to increase production efficiency. This structure allows a winding nozzle to fully utilize a nozzle passing space, making an aligned winding of wire possible and therefore a high density winding possible. The increased winding enhances torque, decreasing cooper loss and so increasing efficiency of the motor. However, with such a configuration, a minute gap may be created when divided cores are linked together, the gap space decreasing torque, leaving a task. Still further, when linking the divided cores, a dimensional difference is likely to appear in an inside periphery of the divided core because of a work precision of the divided core and assembling error of the core, creating an uneven gap distribution between the stator and the rotor, making magnetic variation large, hence causing the vibration and the noise large, leaving still other task.

PTL 1 Japanese Patent Gazette No. 2954552
PTL 2 Japanese Patent Unexamined Publication No. 2001-157428
PTL 3 Japanese Patent Unexamined Publication No. H08-322167
PTL 4 Japanese Patent Unexamined Publication No. H06-217478
PTL 5 Japanese Patent Unexamined Publication No. 2003-111360

SUMMARY OF THE INVENTION

A motor of this invention comprises a rotor having a permanent magnet, the number of which magnet poles is P, and a stator including M pcs of teeth, the teeth arranged in a circumferential direction in a manner to face the permanent magnet through a spatial gap, wherein the stator includes stator core having the number M of the teeth, and a winding wire wound about each of the tooth, wherein the number P of the magnet poles and the number M of the teeth have a relation defined by formulae $(2/3)M<P<(4/3)M$, and $M \neq P$, and wherein ratio (t1/Ds) of teeth tip width t1 to stator inside diameter Ds is given by a formula $0.18<(t1/Ds)<0.25$.

Having this structure, cogging torque is reduced and a motor of a low vibration, a low noise and a high efficiency is provided without accompanying a cost increase or an efficiency reduction.

DETAILED DESCRIPTION OF THE PREFERRED EMBODIMENTS

Hereinafter, preferred embodiments of the invention are explained by referring to drawings.

First Embodiment

Figure 1:
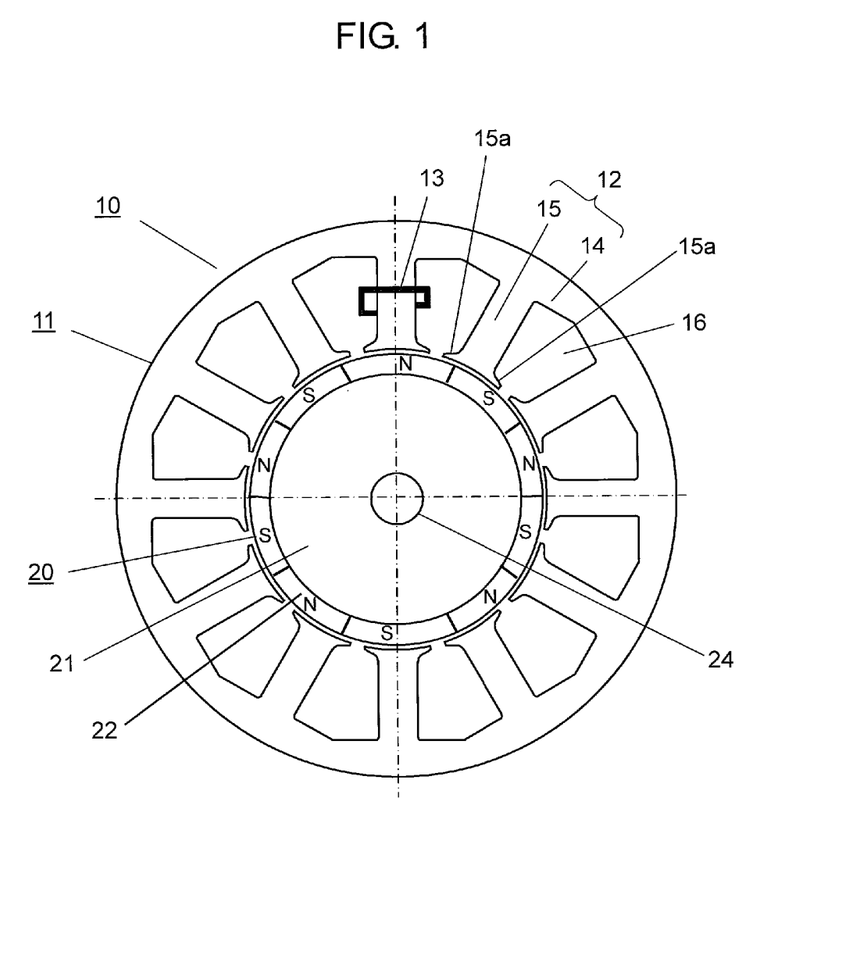
FIG. 1 is a cross section view of a motor according to first exemplary embodiment of the invention.

FIG. 1 is a cross sectional view of motor 10 according to first exemplary embodiment of the invention. FIG. 1 is a cross section viewed from a longitudinal direction of a rotational shaft. With this exemplary embodiment, an inner rotor type brushless motor is explained.

As FIG. 1 shows, motor 10 of this embodiment comprises stator 11 and rotor 20. Stator 11 includes stator core 12 which winding wire 13 winds about. Rotor 20 is rotatably positioned inside an internal circumference of stator 11.

Stator core 12 includes ring-shape yoke 14 and a plurality of teeth 15 extruding from an internal circumference of yoke 14 in which the teeth are arranged along a circumferential direction with equal intervals. At a tip of each tooth 15, wide portion 15a is formed, the wide portion being broadened along the circumference. An opening slot 16 is formed inside an internal circumference of yoke 14 and in-between adjacent teeth 15. Winding wire 13 is wound about every tooth 15 utilizing the opening space of slot 16. FIG. 1 shows only one winding wire 13 is wound about tooth 15, but winding wire 13 is wound about every tooth 15 concentratedly, forming what is called there-phase winding U, V and W. In this embodiment, number of teeth 15 or number of slot 16 is 12.

Stator core 12 in the embodiment is not a conventional divided core linked type but the stator core is integrated into the stator, making one piece. Further, stator core 12 is formed by laminating a plurality of magnetic thin plates in a direction of thickness thereof. By taking this structure, the spatial gap between the divided cores is eliminated, there is no torque reduction and an output power is larger than divided core type. In this way, the embodiment takes advantage the structure of the stator core integrated one piece stator, improving the efficiency of the motor. Since an effect of production error such as an erroneous inside diameter of the divided core is greatly removed with this structure, cogging torque is lowered and thereby a high efficiency, a low noise and a low vibration motor is achieved.

Rotor 20 includes permanent magnet 22 having a plurality of magnet poles disposed on an outer peripheral side of rotor core 21 in which the N pole and the S pole are alternately placed at an identical interval. Rotor 20 is structured to hold permanent magnets 22 pole by pole, or to hold a cylindrical ring type magnet. Rotor 20 is placed so as permanent magnet 22 to face teeth 15 through a certain space that is created inside peripheral side of teeth 15. In this exemplary embodiment, permanent magnet 22 has 10 magnetic poles.

Rotor 20 having rotor core 21 connected to rotational axis 24 is held in a rotatable manner with regard to a center of rotational axis 24, so that rotor 20 rotates in the peripheral direction with facing stator 11. As described, motor 10 of this embodiment has number of magnetic poles P=10 and number of teeth M=12, namely it is 10 poles and 12 teeth structure.

With this structure, when an alternate current is applied to winding wire 13 of stator 11, magnetic attractive force and repulsive force are generated between permanent magnet 22 and teeth 15. With the attractive force and the repulsive force, rotor 20 rotates about rotational axis 24.

Figure 2:
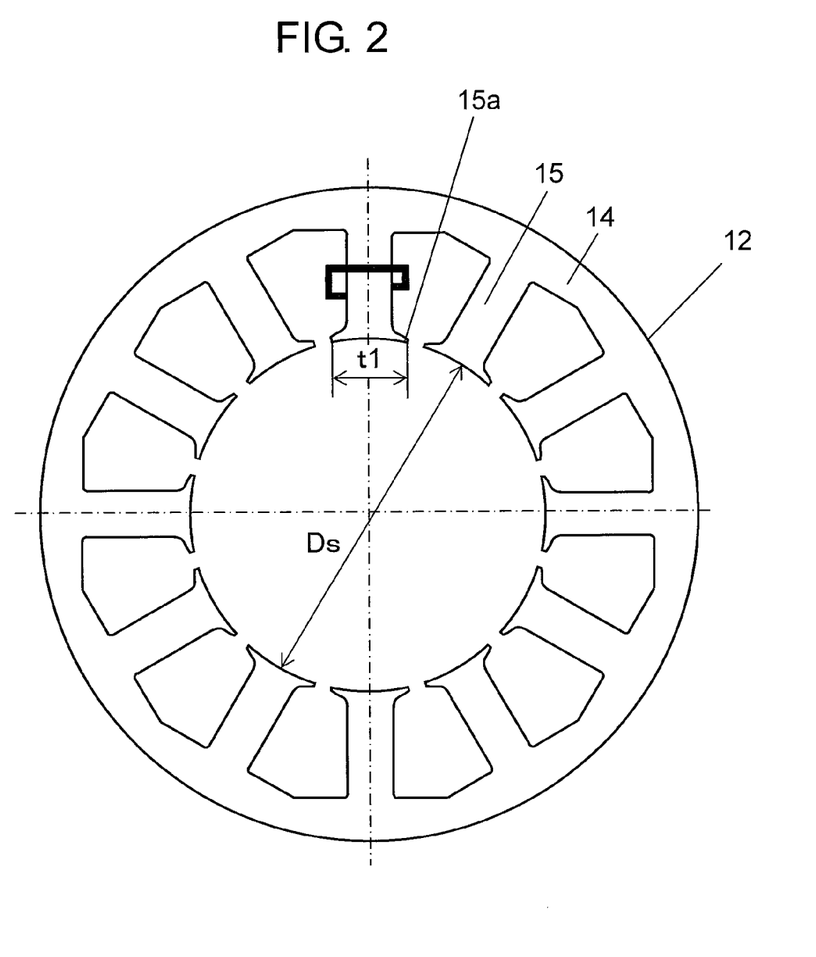
FIG. 2 is a cross section view of a stator core of the motor according to a first exemplary embodiment of the invention.

Next, structural details of stator core 12 of the embodiment are described.

FIG. 2 is a cross section view of stator core 12 of the embodiment. In the embodiment, as is in FIG. 2, Ds which is an inside diameter of stator core 12 and t1 which is a width of a tip of teeth 15 or a dimension of tooth tip wide portion 15a in the peripheral direction are both specified to satisfy a prescribed relationship. In the invention, a ratio (t1/Ds) of teeth tip width t1 to stator inside diameter Ds is specified to be 0.18<(t1/Ds)<0.25. Namely, (t1/Ds) is determined within a range larger than 0.18 and smaller than 0.25.

Following, details of the embodiment is explained. As mentioned, the invention aims to provide a motor which has a reduced cogging torque and of which efficiency reduction is being controlled.

First, in order to reduce the cogging toque, motor 10 is structured with 10 magnetic poles and 12 teeth. Cogging torque is defined to be a ripple of torque at no power application. Cogging torque is caused with a change in permeance (an inverse of magnetic resistance) between stator slots and a rotor, and it is a least common multiple of number of slots and number of magnetic poles per one rotational cycle. When the least common multiple is large, the change in permeance per ripple is small. So, as larger is the least common multiple, the smaller is the cogging torque. In this embodiment, 10 poles 12 teeth structure is selected so that the least common multiple be large (the least common multiple is 60), and that cogging torque be minimum.

In the embodiment, 10 poles 12 teeth structure is exemplary explained, but number P of magnetic poles and number M of teeth may be determined by using formulae of (2/3)M<P<(4/3)M and M≠P, achieving a similar effect as to the exemplary embodiment.

Figure 3:
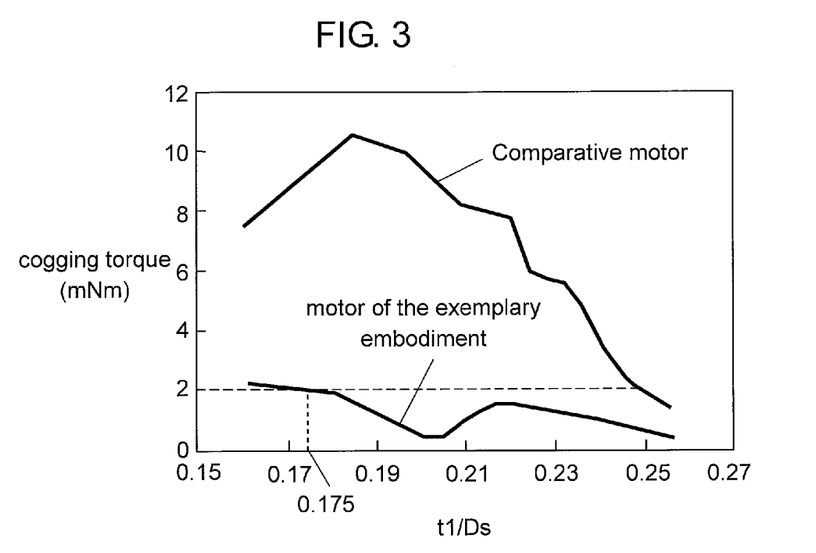
FIG. 3 is a comparison chart illustrating a cogging torque of the motor according to the first exemplary embodiment of the invention and that of a motor for comparison.

In FIG. 3, cogging torque of motor 10 of the exemplary embodiment and of a comparison motor is compared. In FIG. 3, motor 10 of the exemplary embodiment has 10 poles 12 teeth, and the comparative motor has 8 poles and 12 teeth (which least common multiple is 24). The horizontal axis (t1/Ds) in FIG. 3 indicates a ratio between teeth tip width t1 and stator inside diameter Ds, and the vertical axis indicates amplitude of cogging torque with regard to varying (t1/Ds) ratio. The graph shows analytical calculation results of relation between the amplitude of the cogging torque and the (t1/Ds) ratio. Shown in FIG. 3 are values of cogging torque when ratio (t1/Ds) is varied between 0.16 and 0.26. The comparative motor having 8 poles 12 teeth is ordinarily used as a brushless motor for a fan motor of air conditioner, for instance.

As is evidently shown in FIG. 3, when the ratio (t1/Ds) of motor 10 of the embodiment and the ratio (t1/Ds) of the comparative motor are same value, the cogging torque of motor 10 of the embodiment is smaller than that of the comparative motor. It is also indicated that, when the ratio (t1/Ds) changes between 0.16 and 0.26, cogging torque of motor 10 of the embodiment changes two times, while that of the comparative motor changes four times as much. In the fan motor of air conditioner, it is acknowledged that noise caused by cogging torque is allowed as long as cogging torque is below about 2 mNm, therefore cogging torque in (T1/Ds)>0.175 is especially preferable. On the other hand, cogging torque of the comparative sample becomes larger than 2 mNm at a similar (t1/Ds) zone of 0.175<(t1/Ds)<0.25, namely 5 times as larger than embodiment sample at the (t1/Ds) ratio of 0.19. It means that the comparative motor hardly realizes a low ripple or a low noise at the zone of 0.175<(t1/Ds)<0.25.

Above comparison proves that a motor having a smaller cogging torque is obtained by employing 10 poles 12 teeth structure. It also proves that, when structuring motor having 10 poles 12 teeth like motor 10 of the embodiment, the (t1/Ds) ratio is preferred to exceed 0.175 to reduce the affect of cogging torque.

Second, with the embodiment, a structure of preventing reduction of motor efficiency is explained.

It is generally known that copper loss and iron loss are factors affecting efficiency loss of a motor.

First, copper loss Wcu is in a proportional relationship with a square value of current I and resistance value R. Specifically, the relation between copper loss Wcu, current I and resistance value R is expressed by a formula of Wcu=RI². It means, copper loss Wcu changes with a change in a square value of current I, as long as copper wire is identical. Meanwhile, motor torque T is ordinarily proportional to an amount of magnetic flux Φ and current I. In this situation, if teeth wide portion 15a is broadened, an opposing dimension of the wide portion to permanent magnet 22 increases, consequently increasing an amount of magnetic flux Φ to stator core 12. It means, when torque T is unchanged and teeth wide portion 15a is made larger, motor current I becomes smaller; the wider becomes teeth wide portion 15a, the smaller becomes copper loss Wcu.

Second, iron loss Wfe is in a proportional relationship with magnetic flux density B and rotating speed f. As long as rotating speed f is unchanged, iron loss Wfe changes as magnetic flux density B changes. If teeth wide portion 15a is larger, it too becomes easier for the portion to absorb more magnetic flux, increasing magnetic flux density B. Since iron loss Wfe is in the proportional relationship with magnetic flux density B, the wider is teeth wide portion 15a, the larger becomes iron loss Wfe.

Efficiency of a motor is thus dependent on an integrated loss of the copper loss and the iron loss. Copper loss is dominant when teeth wide portion 15a is narrow, and iron loss becomes dominant when teeth wide portion 15a is broad.

With the exemplary embodiment, a magnitude of teeth tip width t1 and inside diameter Ds are specified so that the ratio (t1/Ds) between teeth tip width t1 and inside diameter Ds fall within a specified range. When stator inside diameter Ds is increased, diameter of rotor 20 may be increased, increasing an amount of magnetic flux from permanent magnet 22 to stator core 12, allowing teeth tip width t1 to be increased. Thus, when stator inside diameter Ds is increased, the dimension of teeth wide portion 15a opposing to the permanent magnet may be increased for suppressing the copper loss. Meanwhile, if teeth tip width t1 is increased as stator inside diameter Ds increases, magnetic flux to stator core 12 is increased, increasing the iron loss. As such, if the ratio (t1/D) is set in an appropriate value, the iron loss and the copper loss may both be well controlled, realizing an optimal motor efficiency.

Figure 4:
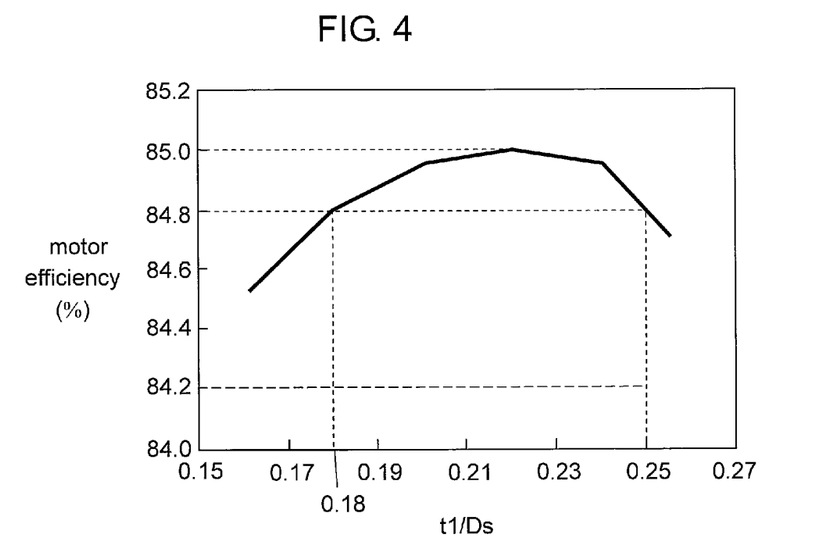
FIG. 4 is a graphical chart illustrating analytical results of a relation between efficiency of the motor of the embodiment and ratio t1/Ds of the same.

FIG. 4 is a graphical chart illustrating analytical results of a relation between motor efficiency and ratio (t1/Ds) of motor 10 of the embodiment.

As shown in FIG. 4, a highest efficiency is achieved when the ratio (t1/Ds) is around 0.215. The motor efficiency falls down from the peak as the ratio (t1/Ds) becomes smaller and the ratio (t1/Ds) becomes larger as well.

In the air conditioner fan motor market where competition in product efficiency is keen, it is generally known that efficiency fall down by 0.2% or more means a significant regression in performance. Therefore, with the embodiment, the zone of 0.18<t1/Ds<0.25 is particularly preferable in which reduction in motor efficiency is at most within 0.2% from the highest point.

As described, with the preferred embodiment, cogging torque is kept small with 10 poles 12 teeth structure. Furthermore, the ratio (t1/Ds) set within a zone larger than 0.18 and smaller than 0.25 prevents motor efficiency to fall down.

Winding wire 13 wound about teeth 15 has preferably a space factor of at least 60%. As long as the winding space factor of winding wire 13 wound on stator 11 is 60% or more of the slot dimension, a performance equal to or better than an identical divided core type motor is achieved.

Stator 11 of motor 10 is preferably resin molded. Resin molded, rigidity of the stator is enhanced and magnitude of resonant vibration of the motor is reduced, securing a higher efficiency, a lower noise and a lower vibration motor.

With the embodiment, a cylindrical ring type permanent magnet 12 is explained. The magnet is not limited to the ring type and other type of magnet such as a segment magnet may be used. Yet, since the rotor of ring type magnet is composed of a single magnet, installation is easy and reliability is high, help reducing an assembling cost. In addition, the ring type magnet has a smaller dimensional difference between magnetic poles and has a smaller magnetic unbalance due to an assembling error, so that a low cost, a low noise and a low vibration motor is provided than by using a plurality of segment magnets. Thus, the ring type permanent magnet is preferred.

Permanent magnet 22 is preferred to be a bonded rare earth magnet. Since bonded rare earth magnet has a stronger magnetic force than a sintered ferrite magnet, an output is high and a miniaturized high efficiency motor is becomes available.

Figure 5:
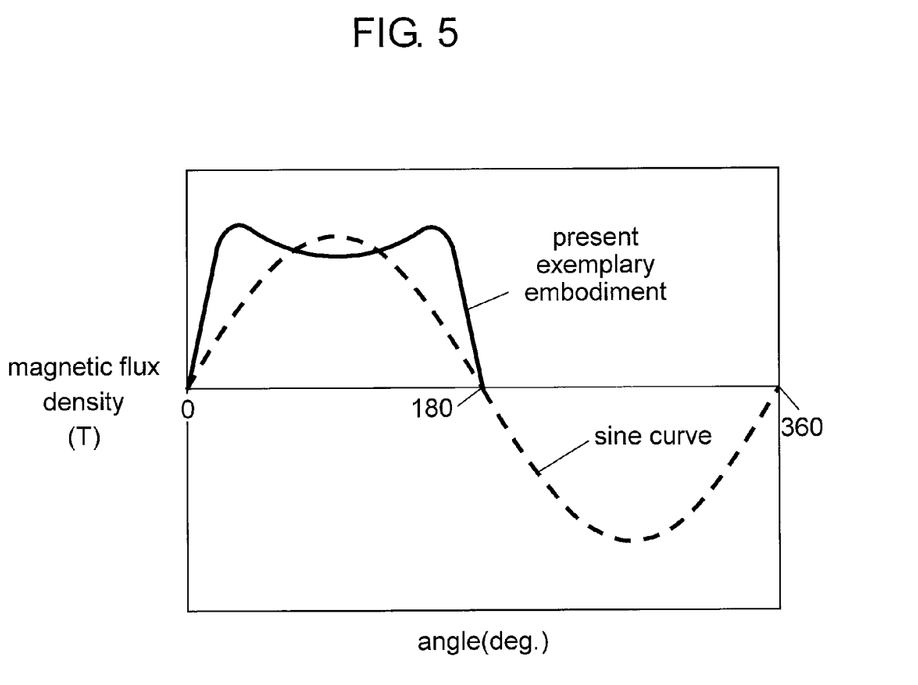
FIG. 5 shows a surface magnetic flux waveform of a permanent magnet according to the first exemplary embodiment of the invention.

With permanent magnet 22, surface magnetic flux is preferred to be magnetized forming substantially a rectangular waveform in the circumferential direction of the rotor. As shown in FIG. 5, when the surface magnetic flux is magnetized to form the rectangular waveform in the circumference direction, the stator receives a larger amount of magnetic flux than when it is in a sinusoidal waveform. The stator thus efficiently utilizes the magnetic force, and therefore the efficiency of the motor is further enhanced.

By installing above structured motor in an electric home apparatus, a low vibration, a low noise and a high efficiency apparatus is realized.

As has been explained, with the motor of the invention, the relation between the number P of poles and the number M of teeth is defined by formulae (2/3)M<P<(4/3)M, and M≠P, with which cogging torque is kept low. Further, with the motor of the invention, the ratio (t1/Ds) between the teeth tip width t1 and the stator inside diameter Ds is given by the formula 0.18<(t1/Ds)<0.25, maintaining the high efficiency of the motor. Thus, the cogging torque of the invention is reduced, and the high efficiency motor with little efficiency fall down is realized.

Second Embodiment

A structure of an indoor equipment of an air conditioner as an electric apparatus of second embodiment of the invention is explained first.

Figure 6:
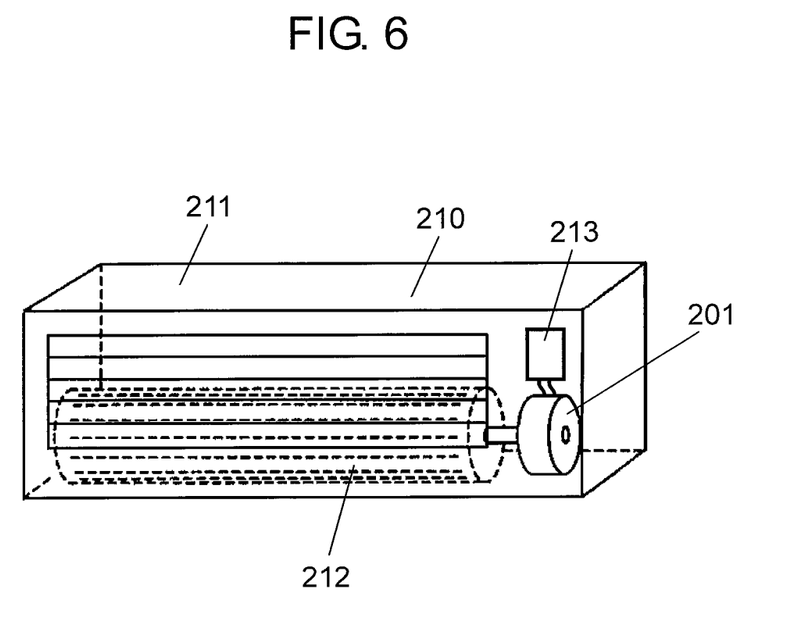
FIG. 6 is a structural drawing of electrical equipment according to a second exemplary embodiment of the invention.

As in FIG. 6, motor 201 is installed inside housing 211 of indoor equipment 210. Cross flow fan 212 is attached to a rotational axis of motor 201. Motor 201 is driven by driving mechanism 213. Powered by driving mechanism 213, motor 210 rotates, turning cross flow fan 212. Rotating cross flow fan 212 sends out air which is conditioned by an indoor heat exchanger (not illustrated) into a room. In this case, motor 210 may be motor 10 of the first exemplary embodiment.

The electric apparatus of the invention includes the motor and the housing installing the motor, the motor being in above mentioned configuration of the invention.

Above, a motor installed in an indoor unit of an air conditioner is explained as an exemplary embodiment of electric apparatus of the invention. This motor may be applied to an outdoor unit of air conditioner, a water heater and a washing machine. It may also be applied to a variety of information apparatus and industrial apparatus.

INDUSTRIAL APPLICABILITY

With the motor of the invention, cogging torque is reduced and an efficiency fall down of the motor is prevented, so that a low vibration, low noise and high efficiency motor is provided. The motor is suitably applied to electric home apparatus where a low vibration, a low noise and a high efficiency are required.

The invention claimed is:

1. A motor being an inner rotor type brushless motor in which a rotor is rotatably positioned inside an internal circumference of a stator, the motor comprising;
    the rotor having a rotor core connected to a rotational axis, and a permanent magnet on which ten (10) magnetic poles are magnetized as a single and cylindrical ring type magnet, the permanent magnet being held on an outer peripheral side of the rotor core; and
    the stator including a stator core having a ring-shape yoke and twelve (12) teeth that extrude from an internal circumference of the ring-shape yoke, and a winding wire wound about each of the teeth, the teeth being arranged in a circumferential direction in a manner to face the permanent magnet through a spatial gap,
    wherein the stator core is configured by the yoke and the twelve (12) teeth which are integrated monolithically with the ring-shape yoke, and
    wherein an interval of adjacent teeth tips is set to be larger than a diameter of the winding wire and ratio (t1/Ds) of teeth tip width t1 to stator inside diameter Ds of the monolithically integrated stator core is set in a range given by a formula $0.18<(t1/Ds)<0.25$ so that cogging torque is reduced below about 2 mNm and reduction in motor efficiency is within 0.2% from a highest point, and
    wherein the teeth tip width t1 is the width of a teeth tip which is wider than the rest of the teeth and the stator inside diameter Ds is larger than an inner diameter of the rotor.

2. The motor as listed in claim 1, wherein the stator core is structured by laminating a plurality of magnetic thin plates in a direction of thickness thereof.

3. An electric apparatus equipped with the motor listed in claim 2.

4. The motor as listed in claim 1, wherein the winding wire wound about the teeth has a space factor of at least 60%.

5. An electric apparatus equipped with the motor listed in claim 4.

6. The motor as listed in claim 1, wherein the stator is molded with a resin.

7. An electric apparatus equipped with the motor listed in claim 6.

8. The motor as listed in claim 1, wherein the teeth tip width t1 is the width of a teeth tip which is wider than the rest of the teeth within a range that does not exceed twice the rest of the teeth.

9. An electric apparatus equipped with the motor listed in claim 8.

10. The motor as listed in claim 1, wherein the permanent magnet is a bonded rare earth magnet.

11. An electric apparatus equipped with the motor listed in claim 10.

12. The motor as listed in claim 1, wherein the permanent magnet is magnetized to have a surface magnetic flux of substantially a rectangular waveform in the circumferential direction.

13. An electric apparatus equipped with the motor listed in claim 12.

14. An electric apparatus equipped with the motor listed in claim 1.

15. The motor as listed in claim 1, wherein the motor efficiency depends from integrated loss which are balanced between iron loss that increase in accordance with teeth tip width t1 and copper loss that decrease in accordance with teeth tip width t1.

* * * * *